United States Patent
Riedle

(10) Patent No.: US 7,444,341 B2
(45) Date of Patent: Oct. 28, 2008

(54) METHOD AND SYSTEM OF DETECTING A CHANGE IN A SERVER IN A SERVER SYSTEM

(75) Inventor: Linda A. Riedle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/879,859

(22) Filed: Jun. 29, 2004

(65) Prior Publication Data
US 2006/0053214 A1 Mar. 9, 2006

(51) Int. Cl.
G06F 7/00 (2006.01)
(52) U.S. Cl. .................................... 707/100
(58) Field of Classification Search ................ 707/100; 713/2; 709/213, 217
See application file for complete search history.

(56) References Cited

U.S. PATENT DOCUMENTS

| | | | |
|---|---|---|---|
| 6,122,677 A | 9/2000 | Porterfield | 710/10 |
| 6,189,100 B1 * | 2/2001 | Barr et al. | 713/182 |
| 6,292,890 B1 | 9/2001 | Crisan | 713/2 |
| 6,349,347 B1 | 2/2002 | Porterfield | 710/10 |
| 6,356,965 B1 | 3/2002 | Broyles et al. | 710/104 |
| 6,535,976 B1 | 3/2003 | Hoggarth et al. | 713/2 |
| 6,601,166 B1 | 7/2003 | Ayyar et al. | 713/2 |
| 6,671,727 B1 * | 12/2003 | Odenwald | 709/227 |
| 6,728,833 B2 * | 4/2004 | Pruett et al. | 711/114 |
| 6,816,950 B2 * | 11/2004 | Nichols | 711/162 |
| 7,130,995 B2 * | 10/2006 | Chu et al. | 713/1 |
| 2002/0133695 A1 | 9/2002 | Khatri et al. | 713/1 |
| 2003/0005276 A1 | 1/2003 | French et al. | 713/2 |
| 2004/0177287 A1 * | 9/2004 | Azuma | 714/7 |
| 2005/0138346 A1 * | 6/2005 | Cauthron | 713/2 |
| 2005/0198523 A1 * | 9/2005 | Shanbhag et al. | 713/200 |
| 2005/0198631 A1 * | 9/2005 | Bisher et al. | 717/178 |
| 2006/0047852 A1 * | 3/2006 | Shah et al. | 709/245 |

* cited by examiner

Primary Examiner—Chong H Kim
(74) Attorney, Agent, or Firm—Sawyer Law Group LLP

(57) ABSTRACT

A method for detecting a change in a server in a server system includes a server system coupled to a network server. The method includes booting the server from the network server. Scan the server by the network server to obtain a new inventory of information. Compare the new inventory of information to a current inventory of information. Utilize the comparison to generate an event wherein at least one event action plan is based upon the event.

12 Claims, 2 Drawing Sheets

METHOD AND SYSTEM OF DETECTING A CHANGE IN A SERVER IN A SERVER SYSTEM

FIELD OF THE INVENTION

The present invention relates generally to servers and more particularly to detecting a change in a server.

BACKGROUND OF THE INVENTION

In today's environment, a computing system often includes several components, such as servers, hard drives, and other peripheral devices. These components are generally stored in racks. For a large company, the storage racks can number in the hundreds and occupy huge amounts of floor space. Also, because the components are generally free standing components, i.e., they are not integrated, resources such as floppy drives, keyboards and monitors, cannot be shared.

A system has been developed by International Business Machines Corp. (IBM) of Armonk, N.Y., which bundles the computing system described above into a compact operational unit. The system is known as an IBM eServer BLADECENTER. The BLADECENTER is a 7U modular chassis that is capable of housing up to 14 individual server blades, A server blade, or blade, is a computer component that provides the processor, memory, hard disk storage and firmware of an industry standard server. Each server can be "hot-plugged" into a slot in the chassis. The chassis also houses supporting resources such as power, switch, management and blower modules, Thus, the chassis allows the individual blades to share the supporting resources.

Each server has a fibre channel card connecting it to a storage area network (SAN) drive from which it boots. A SAN drive is mapped to the world-wide port name (WWPN) of the channel card in the server that the SAN drive is to boot. When a change in the server occurs, for example a fibre channel card fails or is replaced, the server must be removed, the card replaced, the server reinserted to the BLADECENTER, and the server rebooted. However, the SAN drive for that server is not mapped to the WWPN of the new card, therefore the server will fail to boot.

In one scenario, an automatic deployment setting in the BLADECENTER will detect that the server with the new card is failing to boot and will proceed with initializing a new SAN drive from which the server may boot, a standard procedure for new equipment. This is time consuming, wasteful of resources, and unnecessary because the previous SAN boot drive is still capable of booting the server, however the new card and the previous SAN drive fail to recognize one another.

In another scenario, the server will simply fail to boot and require intervention by a technician to reconfigure the system.

Another example is a redundant array of independent disks (RAID). If one of the disks malfunctions and is replaced it may be with a disk that has downlevel firmware on it, relevant to the remaining disks in the redundant array of independent disks (RAID) system. The firmware in the new disk must be manually upgraded.

Accordingly, a need exists for a system and method for saving time, using resources already allocated in a system, saving money in repair technician time, and improving useability in a computer system. The invention addresses such a need.

SUMMARY OF THE INVENTION

A method and system for detecting a change in a server in a server system is described. The method and system include booting the server from a network server and scanning the server by the network server to obtain a new inventory of information. The method and system further include comparing the new inventory of information to a current inventory of information and utilizing the comparison to generate an event wherein at least one event action plan is provided based upon the event.

The advantages of the present invention include saving time and using resources already allocated for booting the server.

DETAILED DESCRIPTION

The present invention relates generally to servers and specifically to detecting a change in a server. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
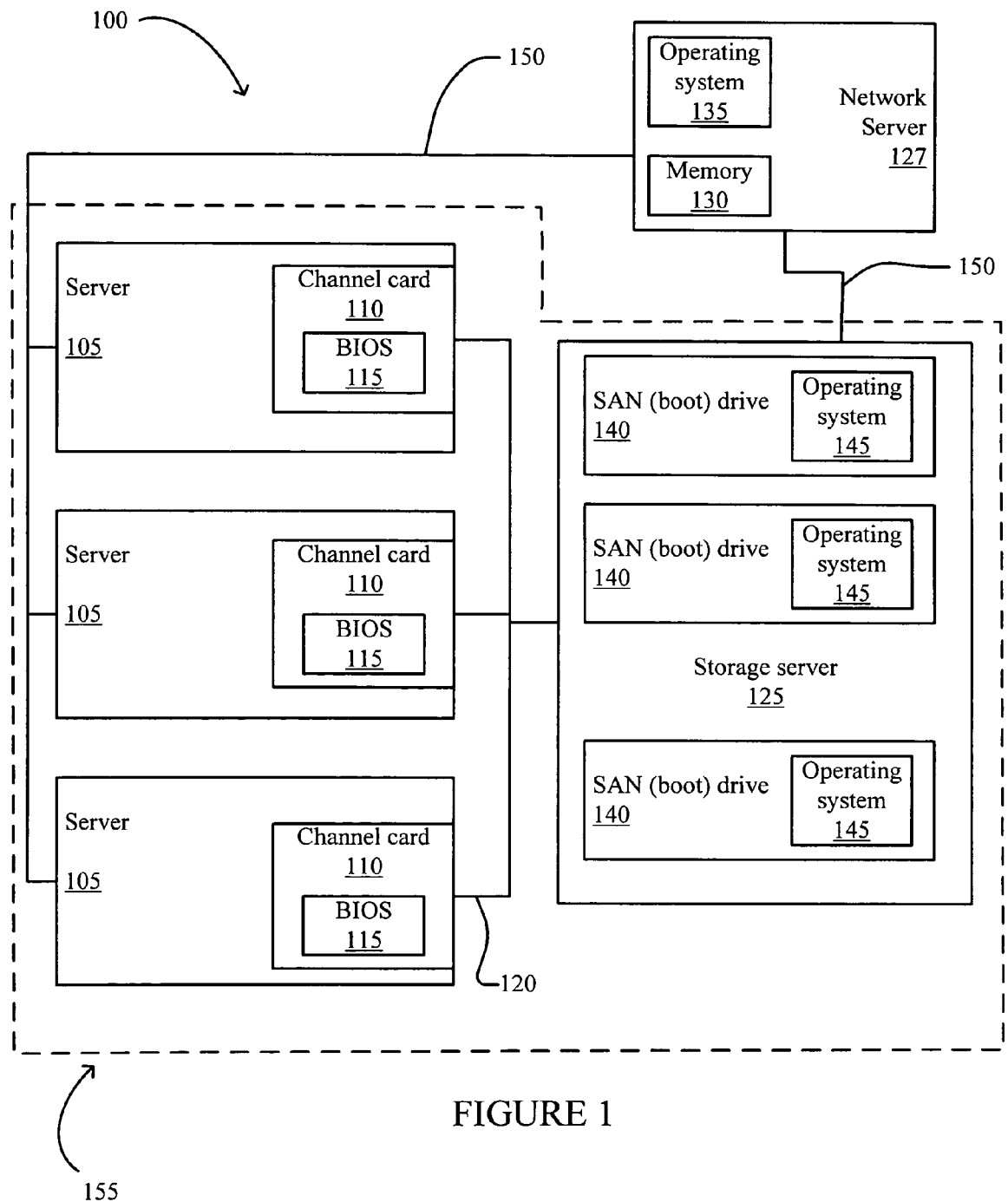
FIG. 1 is a block diagram illustrating one embodiment of the invention in a network system.

FIG. 1 is a block diagram illustrating server system 100 in accordance with the present invention. Servers 105 include channel cards 110 with basic input/output system (BIOS) 115. Channel cards 110 provide an interface to network 120, which in one embodiment is a fibre channel storage area network (SAN). In another embodiment, each server 105 is a redundant array of independent disks (RAID) and has the invention implemented therein.

Servers 105 connect to storage server 125 over network 120. Storage server 125 may include several physically separate hard drives. In one embodiment, storage server 125 includes logical drives, for example storage area network (SAN) boot drives 140. Logical drives may be a single hard drive separated to appear and function as several smaller, separate hard drives, although they are all actually on the same disk or within the same hard drive mechanism. Each boot drive 140 includes an operating system 145. Operating systems 145 may be the same or different, depending on the needs of the user. Each boot drive 140 may be used to boot, or start, with its respective operating system 145, one of servers 105. Each BIOS 115 in channel cards 110 are configured such that channel card 110 will recognize one of boot drives 140, and each of boot drives 140 are mapped to a world-wide port name (WWPN) assigned to one of channel cards 110. The port name uniquely identifies the channel card to which it is assigned. Typically, the WWPN is unique to the channel card. Boot drives 140 could be mapped to multiple WWPNs of multiple cards, although most operating systems do not support boot drive sharing. SAN data drives however are commonly shared (i.e. mapped to multiple WWPNs). In another embodiment, boot drives 140 are data drives.

Servers 105 and storage server 125 are connected to network server 127 over network 160, for example an Ethernet network. Although illustrated as two separate connections, network 150 may be a single connection to BLADECENTER 155. Although storage server 125 is illustrated as part of BLADECENTER 155, it may be located external to BLADECENTER 155 or internal. In one embodiment, network server 127 is a director/remote deployment manager server that initially configures servers 105 and initializes boot drives 140. In another embodiment, network server 127 is a redundant array of independent disks (RAID) management server.

Network server 127 includes operating system 135 and memory 130. Operating system 135 may include operating systems for booting servers 105, or initializing boot drives 140 with operating systems 145, or running network server 127, for example. Although five servers are pictured in FIG. 1, one skilled in the art will recognize that greater or fewer numbers of system servers, network servers, and storage servers may be utilized in the invention.

Figure 2:
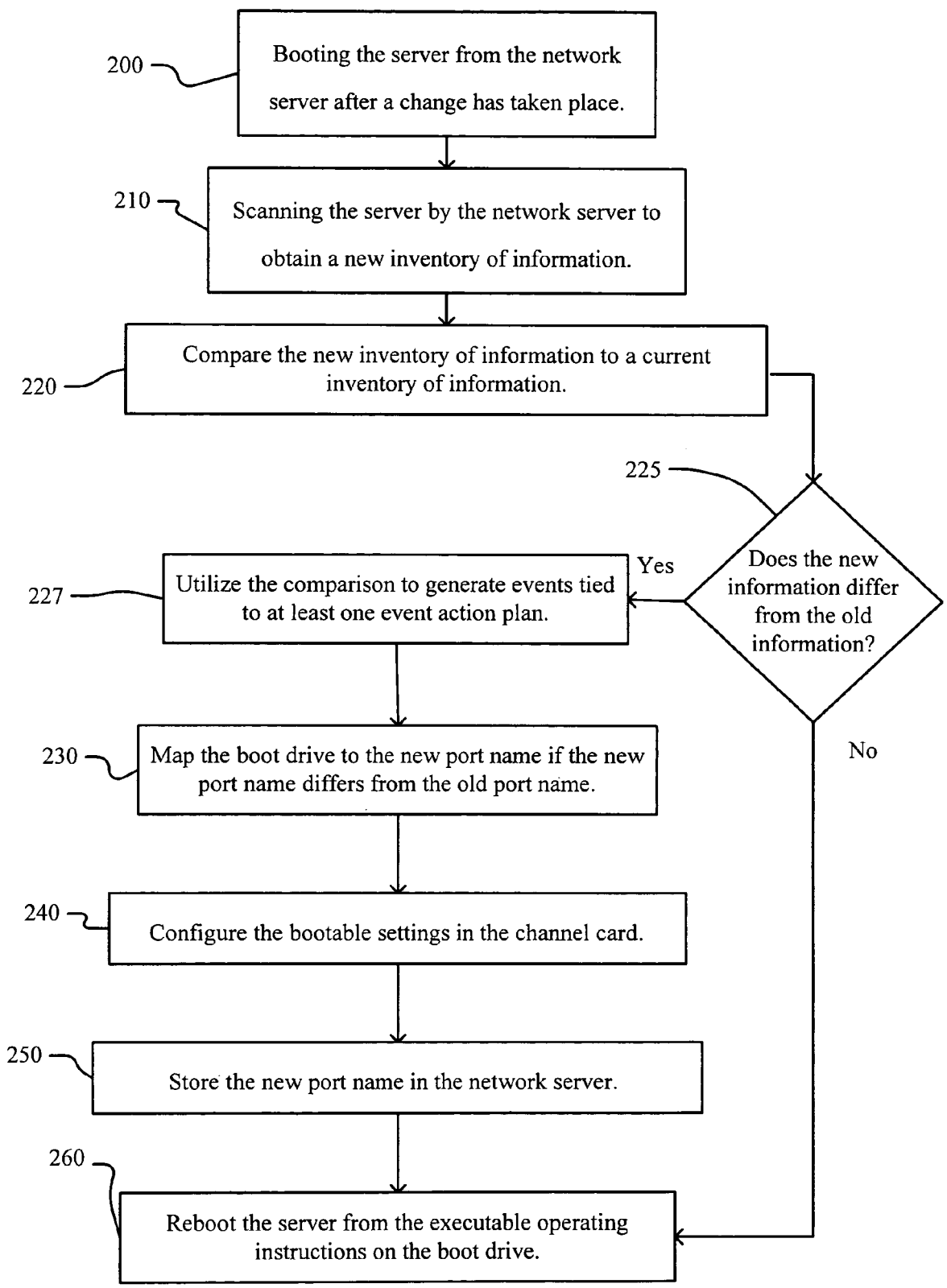
FIG. 2 is a flow diagram illustrating one method of implementing the invention in the network system of FIG. 1.

The operation of server system 100 is described in FIG. 2 in conjunction with FIG. 1. FIG. 2 is a flow diagram illustrating one method of implementing the invention in the network system of FIG. 1 with any one of servers 105.

In block 200, one of servers 105 boots from network server 127. In one embodiment, servers 105 boot from network server 127 every time. In another embodiment, servers 105 boot from network server 127 after a change in the server has occurred. In conventional systems, server 105 boots from one of boot drives 140, rather than network server 127. In the case that server 105 is unable to boot from boot drive 140, network server 127 may initiate a boot sequence and prepare a new boot drive on storage server 125. This implementation of the invention, however, begins the boot sequence with network server 127.

In block 210, network server 127 scans server 105 to obtain a new inventory of information. The new inventory of information may include, for example, channel card 110 and a new port name. The "new" inventory of information or "new" port name may or may not actually be new, rather, it is the unique port name (WWPN) which is assigned to a particular channel card 110.

In block 220, network server 127 compares the new inventory of information to a current inventory of information. For example, this may include comparing the new port name to the "current" port name, wherein the current port name is stored in memory 130 of network server 127. Again, the "current" inventory of information and "current" port name may or may not actually be old (i.e. both the new and current inventories or port names may be identical), rather, it is the information that network server 127 has stored in memory 130 as belonging to server 105.

In block 225, network server 127 determines whether the new inventory of information differs from the current inventory of information.

In block 227, network server 127 utilizes the comparison to generate an event wherein at least one event action plan is provided based upon the event. An event may be implemented in, for example, a server system where the server was booting locally but had SAN data drives. In another example, in a redundant array of independent disks (RAID) system an adapter that is being replaced due to failure or in order to maintain consistent firmware levels, replacement of the adapter may also cause events tied to an event action plan to be generated.

In one embodiment, an event includes block 230, wherein network server 127 maps boot drive 140 to the new port name if the new port name does differ from the old port name. The new and old port names would differ if channel card 110 in server 105 were replaced (or somehow had its port name changed), possible because it malfunctioned. Because each channel card 110 has a unique port name, replacing channel cards 110 results in servers 105 having channel cards 110 that are not mapped to by any of boot drives 140. If server 105 had attempted initially to boot from boot drive 140, as in conventional systems, it would have failed to boot and the initialization procedure described above for network server 127 may have taken over. Instead, the functional space of boot drive 140 is mapped to the new port name of channel card 110. In another embodiment events tied to at least one event action plan include a redundant array of independent disks (RAID) firmware upgrade" event tied to a network server firmware update task.

In block 240, continuing with the embodiment described in block 230, configure bootable settings in BIOS 115 of channel card 110. If channel card 110 has a BIOS that requires configuration in order for server 105 to see boot drive 140 over network 120, then in block 240 the configuration is performed by network server 127. In the redundant array of independent disks (RAID) example, network server 127 may execute a redundant array of independent disks (RAID) firmware update task.

In block 250, the new port name is stored in network server 127, for example in memory 130. Therefore, during the next boot sequence by server 105, network server 127 will recognize the new port name (see blocks 220 and 225) and not proceed with mapping boot drive 140 to server 105. Typically this removes the identity of the old port name, which is associated with the old channel card.

In block 260, server 105 reboots from operating system 145 on boot drive 140, in a regular boot operation as performed by conventional systems. Also, if the new and old port names do not differ as determined in block 220, then after block 225 proceed to block 260.

The invention achieves the objectives of saving time and using resources already allocated for booting the server by avoiding the default response of network server 127. By comparing the new and current inventories, a determination may be made that the channel card has been replaced, for example, rather than the whole server. In cases where the server has been replaced, a new boot drive will have to be created. Otherwise, the time spent and space wasted on the storage server is preserved by executing an event action plan tied to the event of the channel card being replaced (as an example of one event). One event action plan is mapping the existing boot drive for the system server to the port name of the new channel card (or to a new port name of an old channel card). This saves time, system resources, money expended on a technician making the necessary system changes, and ads further usability to a system with hot-swap capability.

In other embodiments, blocks 230, 240, 250, 260, and 270 will differ, depending on the event action plan. For example, replacement of a redundant array of independent disks (RAID) adapter will differ from replacement of a fibre channel card.

Various servers may include a processor, memory, a bus, an input/output (I/O) device, a power supply, and so forth in order to operate. The various combinations and configurations of hardware are not necessary for one of ordinary skill in the art to understand and implement the invention, and are not included in this description in order to avoid obscuring the invention. Also, the invention encompasses the blocks of FIG. 2 in various orders without limitation to the embodiment disclosed herein.

A method and system for detecting a change in a server in a server system has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

The invention claimed is:

1. A method for detecting a change in a server in a server system, the method comprising:
  booting the server from a network server;
  scanning the server by the network server to obtain a new inventory of information from the server, wherein the new inventory of information includes a new port name;
  comparing the new inventory of information to a current inventory of information stored on the network server, wherein the current inventory of information includes a current port name;
  generating an event utilizing the comparison, wherein at least one event action plan is provided based upon the event;
  wherein utilizing the comparison further comprising:
    mapping a boot drive coupled to the server to the new port name in the event that the new port name differs from the current port name;
  wherein utilizing the comparison further comprising:
    storing the new port name in the network server;
  wherein utilizing the comparison further comprising:
    rebooting the server from the executable operating instructions on the boot drive; and
    a channel card having a basic input-output system (BIOS) with bootable settings, utilizing the comparison further comprising:
    configuring the bootable settings in the channel card.

2. A computer-readable medium encoded with a computer program for detecting a change in a server in a server system, the server system being coupled to a network server, the computer program comprising computer-executable instructions for:
  booting a server from a network server after a change has taken place;
  scanning the server by the network server to obtain a new inventory of information, wherein the new inventory of information includes a new port name;
  comparing the new inventory of information to a current inventory of information, wherein the current inventory of information includes a current port name;
  generating an event utilizing the comparison, wherein at least one event action plan is provided based upon the event;
  wherein the instruction for utilizing the comparison further comprising:
    mapping a boot drive coupled to the server to the new port name if the new port name differs from the current port name;
  wherein the instruction for utilizing the comparison further comprising:
    storing the new port name in the network server,
  wherein the instruction for utilizing the comparison further comprising:
    rebooting the server from the executable operating instructions on the boot drive; and
  wherein the server comprises a channel card having a basic input-output system (BIOS) with bootable settings, and the instruction for utilizing the comparison further comprising:
    configuring the bootable settings in the channel card.

3. A network server comprising:
  a memory having a program configured to scan a server in a system of servers in order to obtain a new inventory of information including a new port name from the server, to compare the new inventory of information to a current inventory of information
  including a current port name stored in the network server, generating an event utilizing the comparison, wherein at least one event action plan is provided based upon the event;
  wherein utilizing the comparison further comprising:
    mapping a boot drive coupled to the server to the new port name in the event that the new port name differs from the current port name;
  wherein utilizing the comparison further comprising:
    storing the new port name in the network server;
  wherein utilizing the comparison further comprising:
    rebooting the server from the executable operating instructions on the boot drive; and
  wherein the server comprises a channel card having a basic input-output system (BIOS) with bootable settings, and utilizing the comparison further comprising:
    configuring the bootable settings in the channel card.

4. The network server of claim 3 further configured to store the new port name.

5. The network server of claim 4 further configured to replace the current port name with the new port name.

6. The network server of claim 5 further configured to reboot from a boot drive.

7. A method for detecting a change in a server in a server system, the method comprising:
  booting a server from a network server, wherein the server comprises a port name;
  scanning the server by the network server to obtain a new inventory of information from the server, wherein the new inventory of information includes a new port name;
  comparing the new inventory of information to a current inventory of information stored on the network server; and
  generating an event by utilizing the comparison to provide a redundant array of independent disks firmware upgrade;
  wherein utilizing the comparison further comprising:
    mapping a boot drive coupled to the server to the new port name in the event that the new port name differs from the current port name;
  wherein utilizing the comparison further comprising:
    storing the new port name in the network server;
  wherein utilizing the comparison further comprising:
    rebooting the server from the executable operating instructions on the boot drive; and
  wherein the server comprises a channel card having a basic input-output system (BIOS) with bootable settings, and utilizing the comparison further comprising:
    configuring the bootable settings in the channel card.

8. The method of claim 7, the event action plan including a network server firmware update task.

9. A computer-readable medium encoded with a computer program for detecting a change in a server in a server system, the server system being coupled to a network server, the computer program comprising computer-executable instructions for:

booting a server from a network server after a change has taken place;

scanning the server by the network server to obtain a new inventory of information, wherein the new inventory of information includes a new port name;

comparing the new inventory of information to a current inventory of information, wherein the current inventory of information includes a current port name; and generating an event utilizing the comparison to provide a redundant array of independent disks firmware upgrade;

wherein utilizing the comparison further comprising:
mapping a boot drive coupled to the server to the new port name in the event that the new port name differs from the current port name;

wherein utilizing the comparison further comprising:
storing the new port name in the network server;

wherein utilizing the comparison further comprising:
rebooting the server from the executable operating instructions on the boot drive; and wherein the server comprises a channel card having a basic input-output system (BIOS) with bootable settings, and utilizing the comparison further comprising:
configuring the bootable settings in the channel card.

10. The computer-readable medium of claim 9, the event action plan including a network server firmware update task.

11. A network server comprising:
a memory having a program configured to scan a server in a system of servers in order to obtain a new inventory of information from the server, to compare the new inventory of information to a current inventory of information stored in the network server, and to generate an event, utilizing the comparison, to provide a redundant array of independent disks firmware upgrade;

wherein utilizing the comparison further comprising:
mapping a boot drive coupled to the server to the new port name in the event that the new port name differs from the current port name;

wherein utilizing the comparison further comprising:
storing the new port name in the network server;

wherein utilizing the comparison further comprising:
rebooting the server from the executable operating instructions on the boot drive; and wherein the server comprises a channel card having a basic input-output system (BIOS) with bootable settings, and utilizing the comparison further comprising:
configuring the bootable settings in the channel card.

12. The network server of claim 11, the event action plan including a network server firmware update task.

* * * * *